US010029786B1

(12) United States Patent
Adams

(10) Patent No.: US 10,029,786 B1
(45) Date of Patent: Jul. 24, 2018

(54) LIGHT AIRCRAFT USING PARACHUTE/PARAGLIDER WING

(71) Applicant: Richard D. Adams, Madison, AL (US)

(72) Inventor: Richard D. Adams, Madison, AL (US)

( * ) Notice: Subject to any disclaimer, the term of this patent is extended or adjusted under 35 U.S.C. 154(b) by 2 days.

(21) Appl. No.: 15/683,634

(22) Filed: Aug. 22, 2017

Related U.S. Application Data

(63) Continuation-in-part of application No. 15/391,517, filed on Dec. 27, 2016, now Pat. No. 9,738,383, which is a continuation-in-part of application No. 14/716,785, filed on May 19, 2015, now Pat. No. 9,527,596, which is a continuation-in-part of application No. 13/410,225, filed on Mar. 1, 2012, now Pat. No. 9,033,281.

(60) Provisional application No. 61/448,053, filed on Mar. 1, 2011.

(51) Int. Cl.
*B64C 31/024* (2006.01)
*B64C 31/036* (2006.01)
*B64D 17/34* (2006.01)
*B64D 17/38* (2006.01)

(52) U.S. Cl.
CPC .......... *B64C 31/024* (2013.01); *B64C 31/036* (2013.01); *B64D 17/34* (2013.01); *B64D 17/38* (2013.01)

(58) Field of Classification Search
CPC ..... B64C 31/024; B64C 31/036; B64D 17/34; B64D 17/38
See application file for complete search history.

(56) References Cited

U.S. PATENT DOCUMENTS

| 3,361,388 A * | 1/1968 | Girard | B64C 31/032 244/48 |
| 4,189,019 A * | 2/1980 | Zech | A63C 5/08 114/315 |
| 4,415,131 A * | 11/1983 | Bertelsen | B64C 39/066 244/123.9 |
| 4,657,207 A * | 4/1987 | Poling | B60F 5/02 180/7.4 |
| 4,875,642 A * | 10/1989 | Flynn | B64C 31/024 244/13 |
| 5,078,335 A * | 1/1992 | David | B60F 5/02 244/2 |
| 5,620,153 A * | 4/1997 | Ginsberg | B64C 31/036 244/13 |
| 6,877,690 B1 * | 4/2005 | Bragg | B60F 5/02 244/2 |

(Continued)

FOREIGN PATENT DOCUMENTS

EP 2607236 A2 6/2013

*Primary Examiner* — Valentina Xavier
(74) *Attorney, Agent, or Firm* — Mark Clodfelter

(57) ABSTRACT

A powered air vehicle is disclosed. The air vehicle includes a parachute/parafoil or similar lifting body, with a frame structure suspended vertically below the parachute and comprising of all propulsion and flight control systems generally at the upper end of the frame structure. In one embodiment, a propulsion source is mounted on top of the frame structure, which also house the battery module, main parafoil/parachute system, flight control systems, and structure for carrying an individual user below the propulsion source. Control arms control pitch of the propulsion source to control altitude, and are also used to control direction.

20 Claims, 18 Drawing Sheets

(56) References Cited

U.S. PATENT DOCUMENTS

| | | | | |
|---|---|---|---|---|
| 7,048,227 B2* | 5/2006 | Towley, III | ............... | B60F 5/02 |
| | | | | 244/13 |
| 7,178,757 B1* | 2/2007 | Breese | .................... | B64C 27/02 |
| | | | | 244/17.11 |
| 8,408,488 B2* | 4/2013 | Leaver | .................... | B64C 27/20 |
| | | | | 244/12.2 |
| 8,561,936 B2* | 10/2013 | Matte | .................... | B64C 31/032 |
| | | | | 244/16 |
| 8,894,015 B2* | 11/2014 | Contoret | .............. | B64C 39/026 |
| | | | | 244/151 R |
| 9,561,850 B2* | 2/2017 | Tsunekawa | ............. | B64C 27/20 |
| 9,586,689 B2* | 3/2017 | Cattani | ................ | B64C 31/036 |
| 2002/0113165 A1* | 8/2002 | Moshier | ............... | B64C 39/026 |
| | | | | 244/4 A |
| 2007/0023566 A1* | 2/2007 | Howard | ................... | B60F 5/02 |
| | | | | 244/2 |

* cited by examiner

500 →

← 500

LIGHT AIRCRAFT USING PARACHUTE/PARAGLIDER WING

CROSS REFERENCE TO RELATED APPLICATIONS

This application is a continuation-in-part of Applicant's U.S. patent application Ser. No. 15/391,517, filed Dec. 27, 2016, to be issued as U.S. Pat. No. 9,738,383 on Aug. 22, 2017, which is a continuation-in-part of Applicant's U.S. patent application Ser. No. 14/716,785, filed May 19, 2015, now U.S. Pat. No. 9,527,596, issued Dec. 27, 2016, which is a continuation-in-part of Applicant's U.S. patent application Ser. No. 13/410,225 filed Mar. 1, 2012, now U.S. Pat. No. 9,033,281, issued May 19, 2015, and which in turn claims the benefit of Applicant's U.S. provisional application No. 61/448,053, filed Mar. 1, 2011. U.S. Pat. Nos. 9,738,383, 9,527,596, 9,033,281 and provisional application No. 61/448,053 are all incorporated herein in their entirety by reference.

FIELD OF THE INVENTION

This invention relates generally to powered parachutes, parafoils, paragliders, or other fabric type wings. Particularly, the present invention relates to improved propulsion and control for use by an individual suspended vertically below a propulsion device when engaging in paragliding, powered paragliding, powered parachuting, paramotoring, hang gliding, and other similar activities.

SUMMARY OF THE INVENTION

The present invention is a lightweight air vehicle/powered parafoil/parachute system small enough to be carried, deployed, and flown by one individual, and deployed from the ground or from an aircraft. Various lifting bodies, parachutes, or wings attached to an individual by a harness or similar apparatus may be used when deployed at altitude. A frame houses a main parafoil/parachute, flight controls, and propulsion system for a parafoil/parachute, the frame being attached to a user. The user can deploy the parafoil/parachute, control the propulsion system, which in turn controls altitude, and direction of the apparatus when it is connected to a parafoil/parachute or the like. In one embodiment, a single user is carried by the apparatus, while in other embodiments multiple users could fly using the present invention. The present invention will allow an individual to attach a standard parafoil/parachute to the frame of the air vehicle/apparatus and convert it to a powered aircraft, extending a distance the frame/parachute can travel and maintain flight when compared to a non-powered parafoil/parachute. The present invention allows for the propulsion system to be pitched up and down, giving the operator the ability to change altitude and overcome the typical speed limitations of a powered parachute or paraglider, as well as an ability to pull the risers or control lines of the paraglider/parachute to control direction/bank angle.

BACKGROUND OF THE INVENTION

A number of systems are in use today that employ unpowered parachutes to carry individuals to the ground safely from failing aircraft. Powered parachutes or paragliders may be used as air vehicle platforms, such as with a typical powered paraglider.

Also in the prior art are powered parachutes where a person is strapped vertically into a harness attached to the parachute, with an engine having a propeller mounted to the person's back. One example of such prior art is a recreational apparatus disclosed in European patent no. EP2607236 A2, entitled APPARATUS AND METHOD OF PARAGLIDERS, which posits a propulsion system attached the user's waist, with two propulsion devices attached to a harness on the right and left side of the user. This design may be adequate for some recreational applications, but for a military design, the harness and propulsion locations would interfere with additional equipment typically required to be carried by military users. In addition, lower body manipulation required for control of this apparatus could be a serious issue with military parachutists that carry a large amount of external equipment. Another issue with the prior art apparatus is thrust pitch control; with the hands being in the up positon and holding onto risers for bank/directional control, motor pitch must be manipulated by changing one's body position. Again, this can be difficult to perform by military personnel carrying equipment, as well as being tiring over time.

The present invention overcomes such inadequacies by placing all vehicle control above the user and allowing all directional and propulsion controls to be manipulated by the user's arms and hands.

Similar to Applicant's U.S. application Ser. No. 13/410, 225, this embodiment incorporates many similar benefits, such as maintaining a vertical center of gravity and allowing for increased stability by the placement of the propulsion system above or in the vicinity of the control arm. The ability to angle the propulsion system has multiple benefits; one benefit is ability to overcome some of the speed restrictions of a typical paraglider, such as with Flynn's U.S. Pat. No. 4,875,642 A patent, which is the typical configuration of a paraglider that does not have the ability to pitch its propulsion system. Being able to pitch the propulsion system is very useful in controlling altitude, and overcomes some of the drag of the parachute. This ability to pitch the motor is also beneficial in hazardous wind conditions and can prevent turbulence and parachute collapse by assisting in maintaining a positive-G force on the chute by changing pitch angle and speed, in addition to advantageously changing a center of pressure in the parachute. The ability to pitch the motor, as well as reverse the propeller direction (for electric motors) can assist in slowing the aircraft to a much slower and safer speed during landings. The present invention incorporates airframe navigation lights 360 on the outer ends of the left and right outer control arms (245 and 246) as well as at the top of the propulsion system 220 battery and electronics assembly 222 for flight safety reasons. Other embodiments may contain infrared illumination capabilities, depending on the user's needs.

DETAILED DESCRIPTION OF THE DRAWINGS

Figure 1:
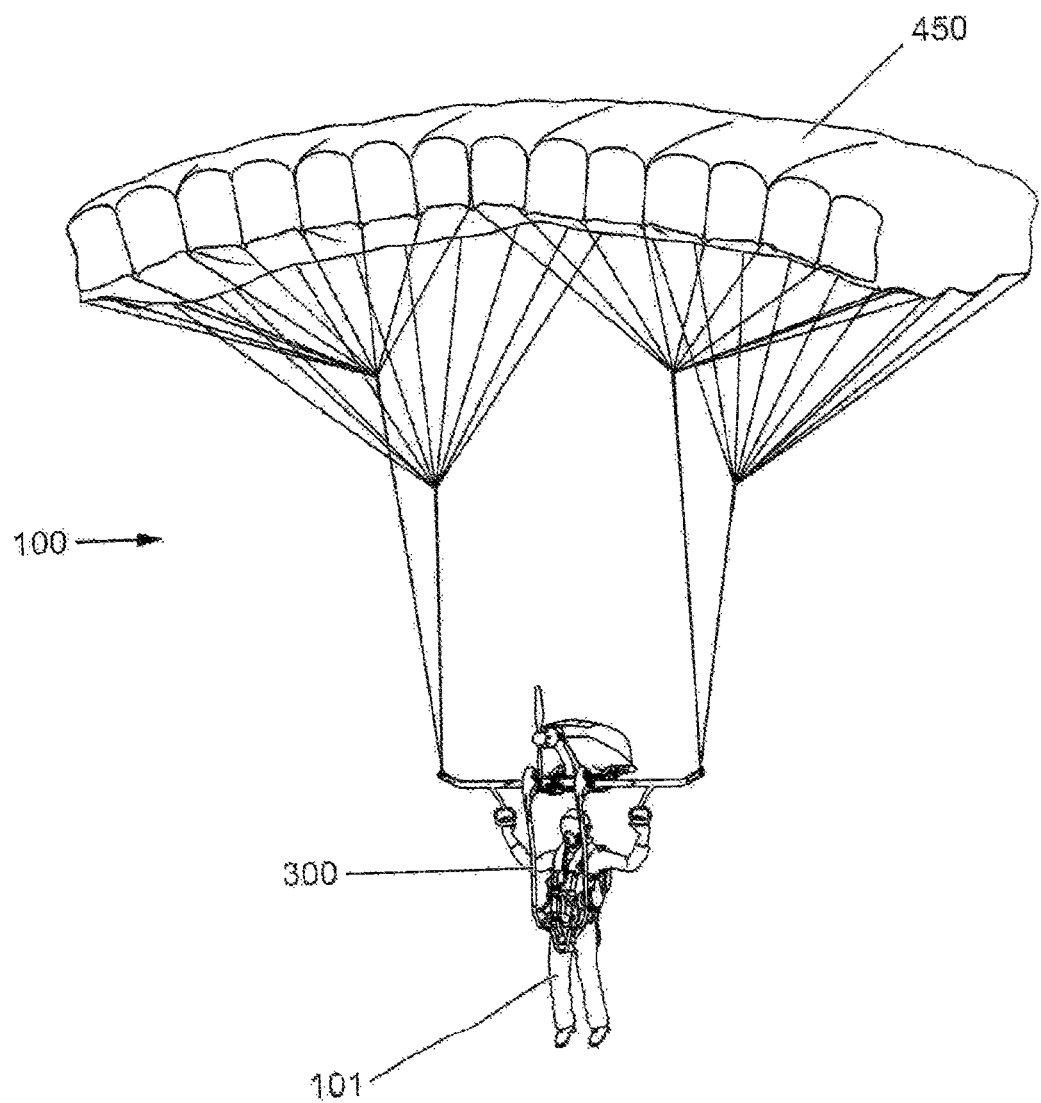
FIG. 1 is a perspective view slightly from the right, of a paraglider chute embodiment deployed configuration of the air vehicle with user in-flight of the instant invention.

Referring initially to FIG. 1, a front perspective view of a lightweight aircraft or air vehicle 100 shown in a flight configuration with an operator/user 101 onboard and attached to a frame assembly 300. The frame assembly 300, in this embodiment, hangs vertically below a propulsion and control unit 200 in turn suspended from a main parachute, parafoil or the like 450. As a powered, the vehicle is capable of flying any distance as limited by its fuel or battery supply and glide distance determined by altitude and prevailing winds. The vehicle is controllable with respect to altitude and direction, as will be explained. While shown and described as a battery powered propeller-driven craft, it should be apparent that a ducted fan may be used for propulsion, as well as using a chemical fuel engine or jet engine for propulsion.

Referring to FIGS. 2, and 2A-2D, the frame assembly 300 incorporates all of the major components to suspend a user 101 (FIGS. 1 and 2B) and allow the user to operate and control the air vehicle. A seat assembly 330 may be provided in some embodiments to serve as a platform for the user to sit on, in addition to being strapped to the frame. In these embodiments, user 101 operates the air vehicle 100 (FIGS. 1 and 2B) while sitting on the seat assembly, which is attached to the frame assembly 300 by a seat post 331. User 101 (FIGS. 1, 6, and 7) is secured in the seated positon by wearing a harness assembly 340 (FIGS. 7, and 8) which is secured to frame assembly 300 by harness assembly quick release male 345 and female 346 fittings (FIGS. 2, 2B, 6, 7, and 8). In some embodiments anticipated to be dropped from aircraft, fittings 345 and 346 would be constructed to be sufficiently durable to withstand stresses of an opening shock of a parachute to prevent the user from falling. In other embodiments only intended to be deployed from ground level or relatively close to the ground, the fittings may be somewhat less durable.

Figure 2:
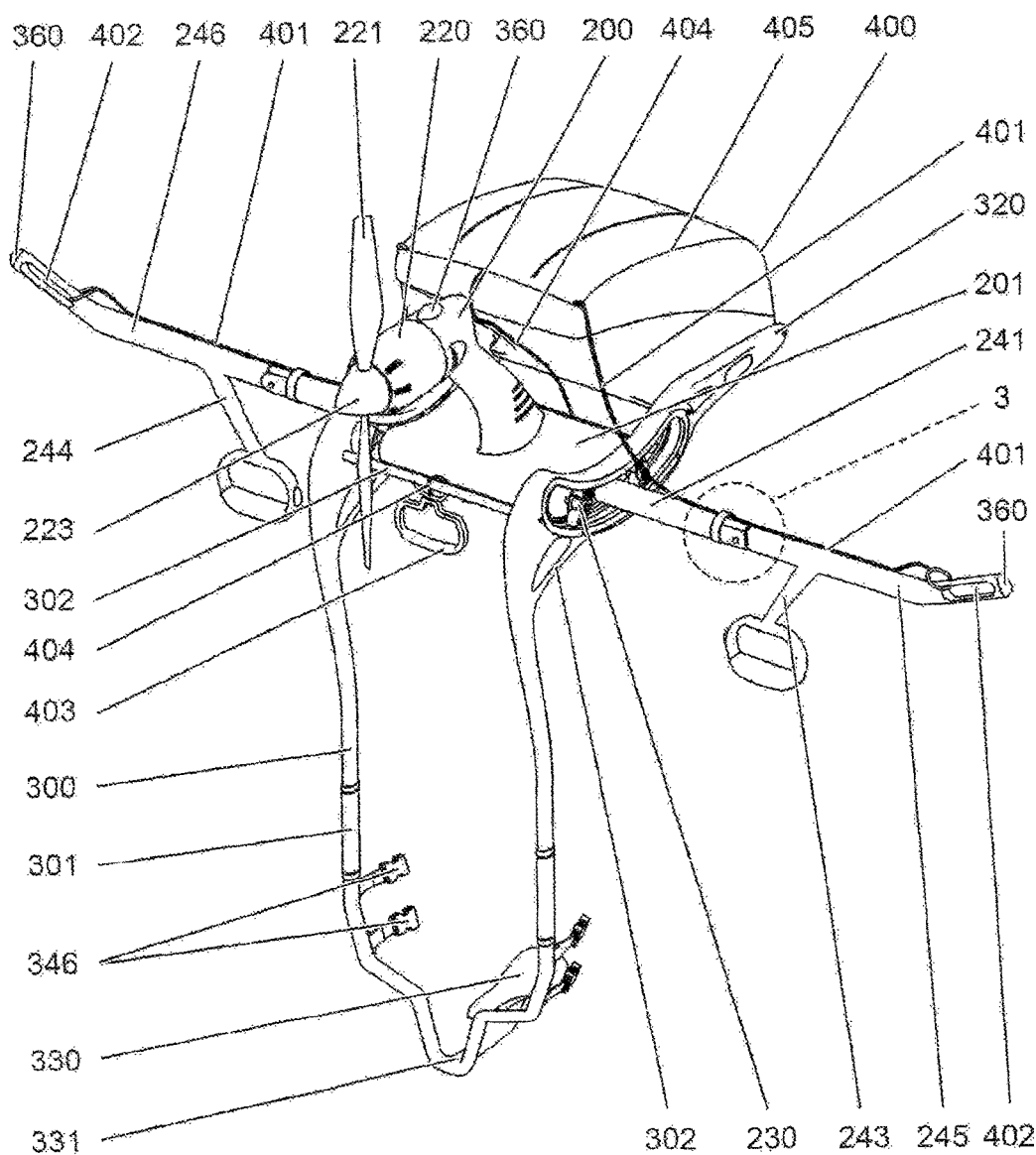
FIG. 2 is a front view from slightly right and above, of the frame and propulsion assembly of the air-vehicle without chute attached configuration of the instant invention.
Figure 2A:
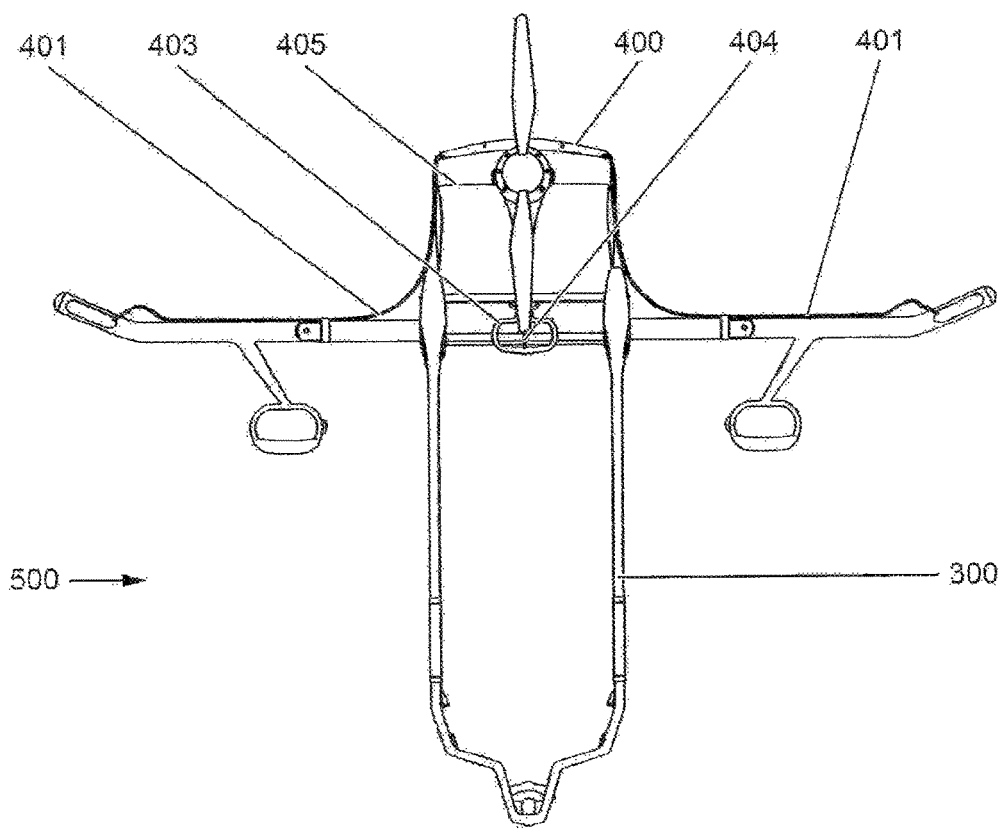
FIG. 2A is a front view of the frame and propulsion assembly of the air-vehicle with no chute or operator/user.
Figure 2B:
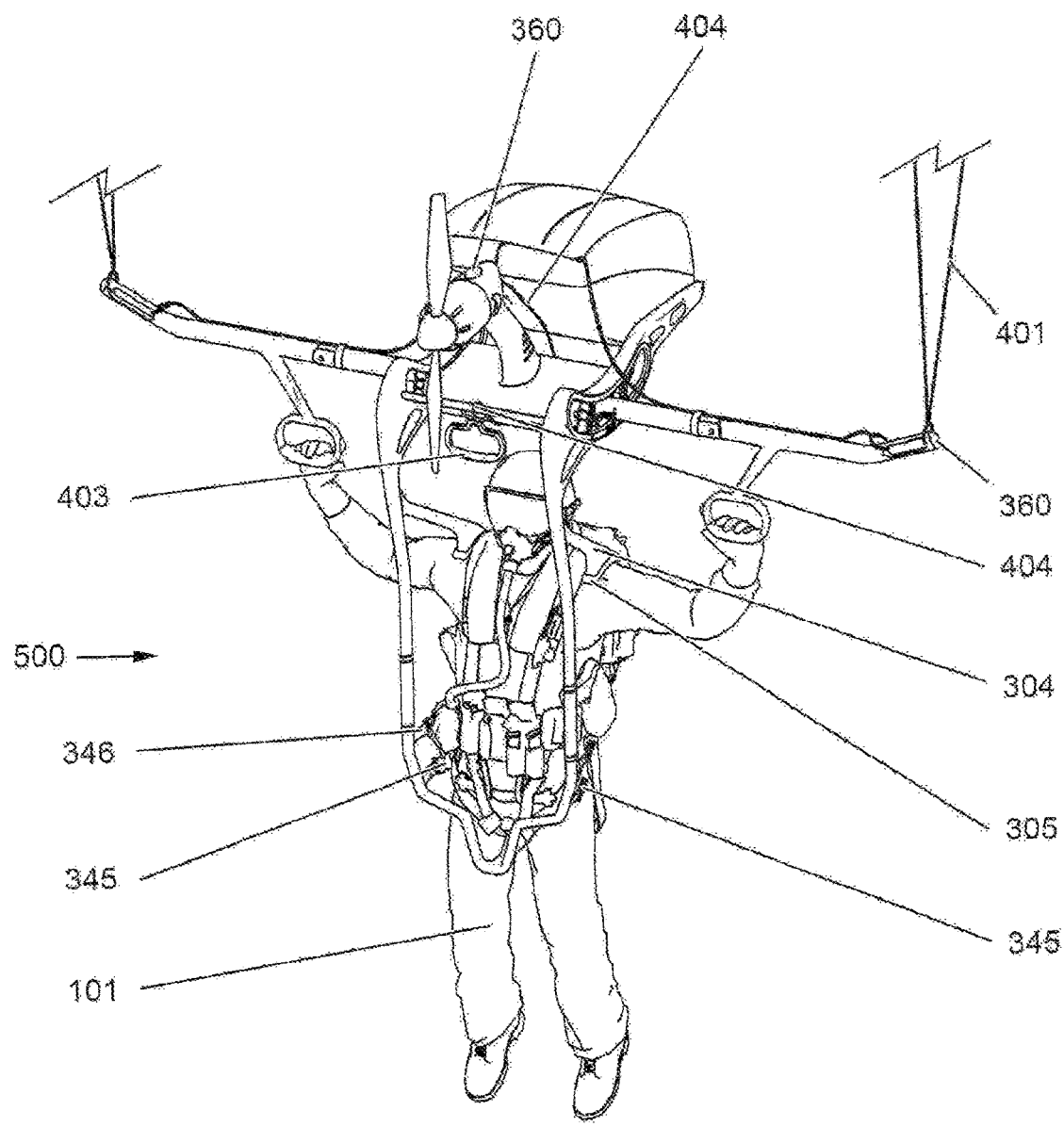
FIG. 2B is a front view from slightly right and above, of the air-vehicle frame and propulsion assembly without visible chute and operator/user.
Figure 2C:
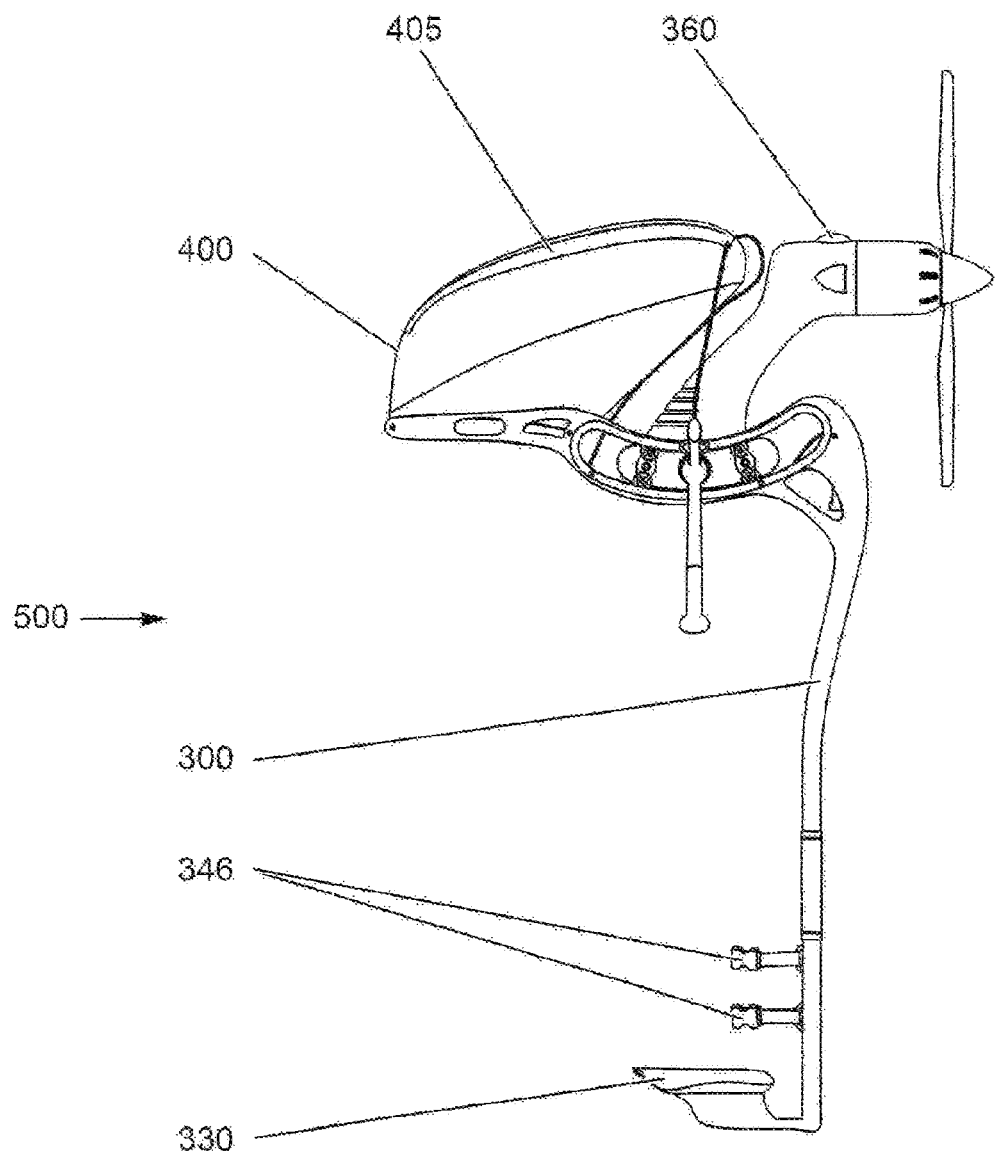
FIG. 2C is a right side view of the frame and propulsion assembly of the air-vehicle without chute attached configuration and with no operator/user.
Figure 2D:
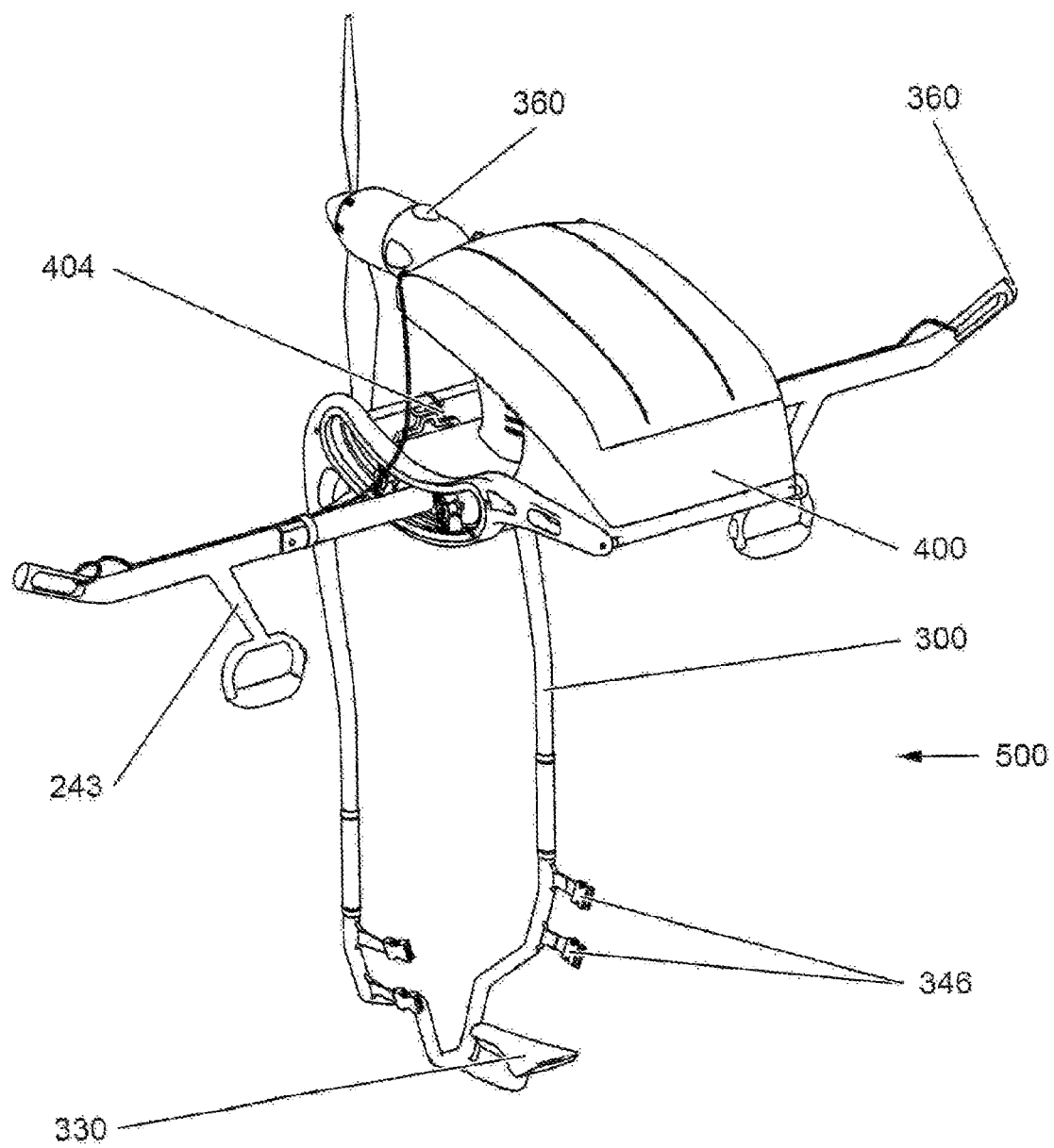
FIG. 2D is a left side perspective view from slightly aft and from the left, of the frame and propulsion assembly of the air-vehicle without chute attached and with no operator/user.
Figure 2E:
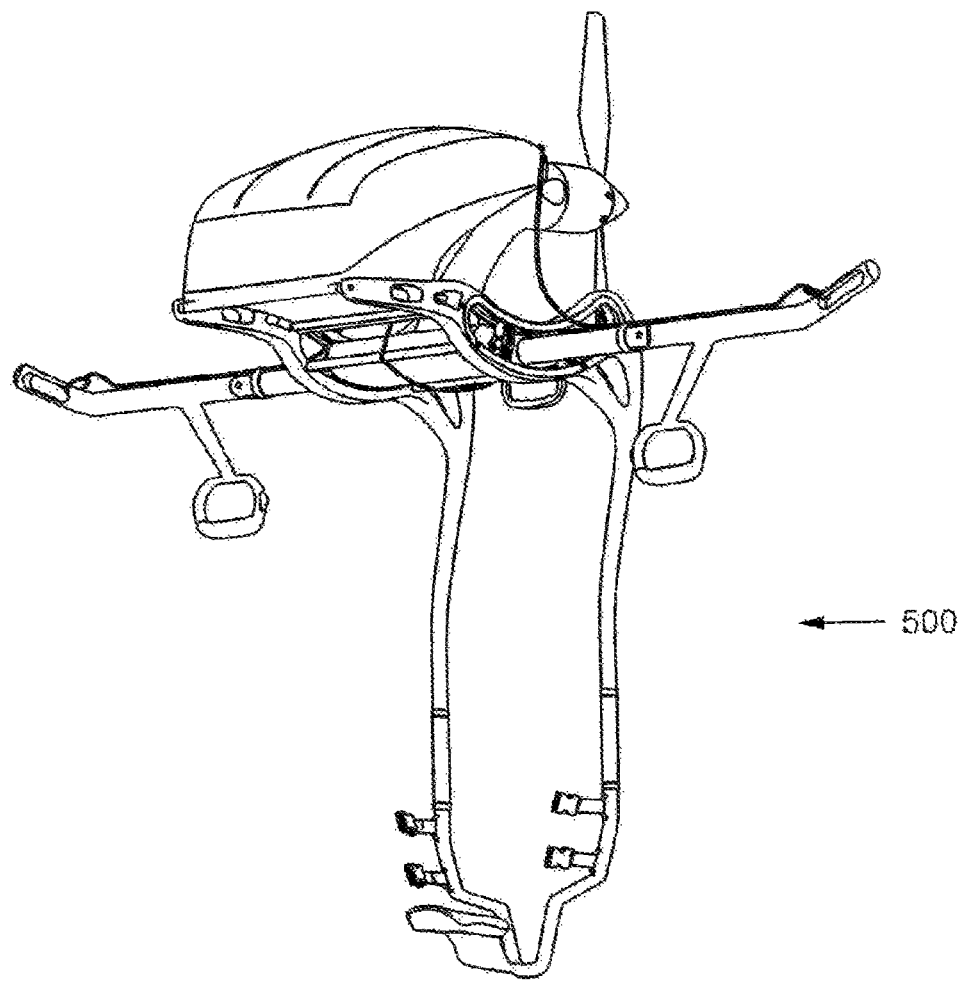
FIG. 2E is a left side perspective view from slightly aft and from the right, of the frame and propulsion assembly of the air-vehicle without chute attached and with no operator/user.
Figure 2F:
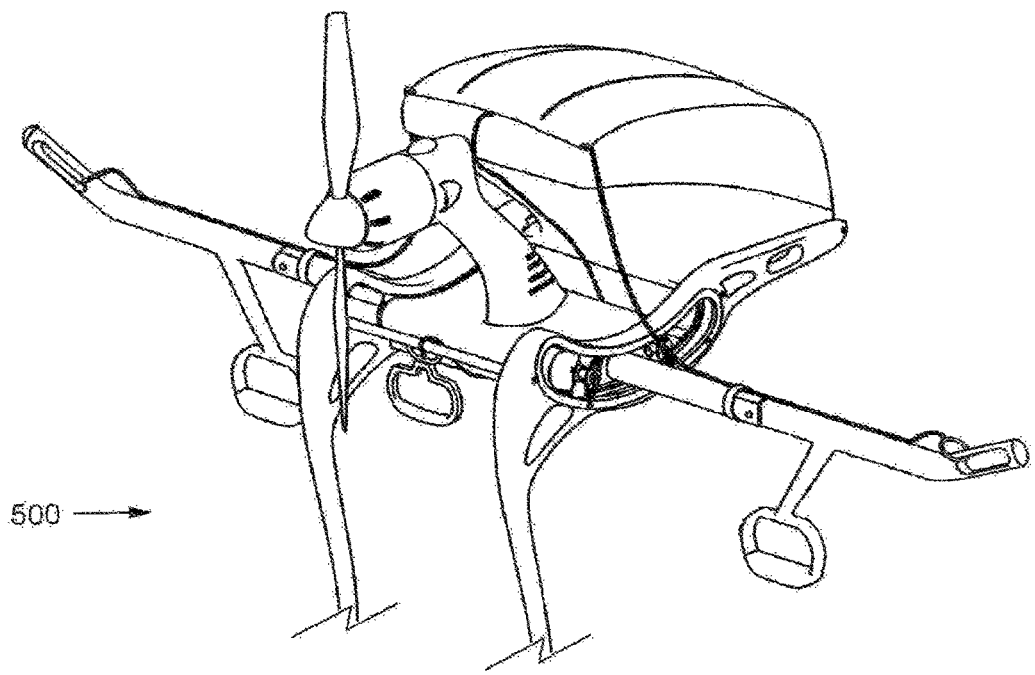
FIG. 2F is a left side perspective view from slightly forward and from the left, of the frame and propulsion assembly of the air-vehicle without chute attached and with no operator/user.
Figure 2G:
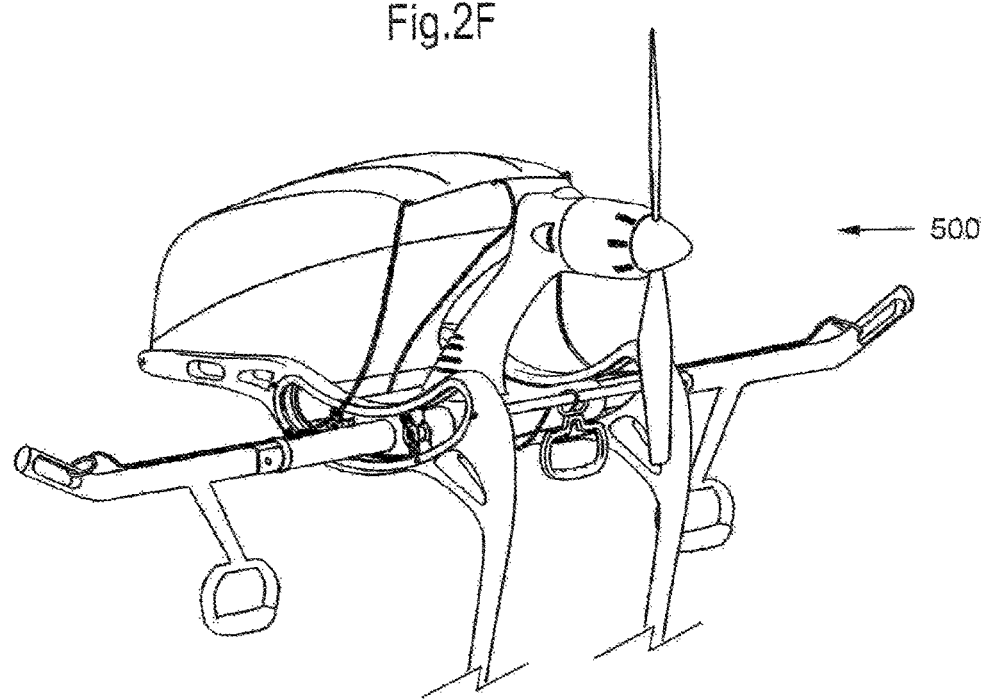
FIG. 2G is a front perspective view from slightly forward from the right, of the frame and propulsion assembly of the air-vehicle without chute attached and with no operator/user.
Figure 2H:
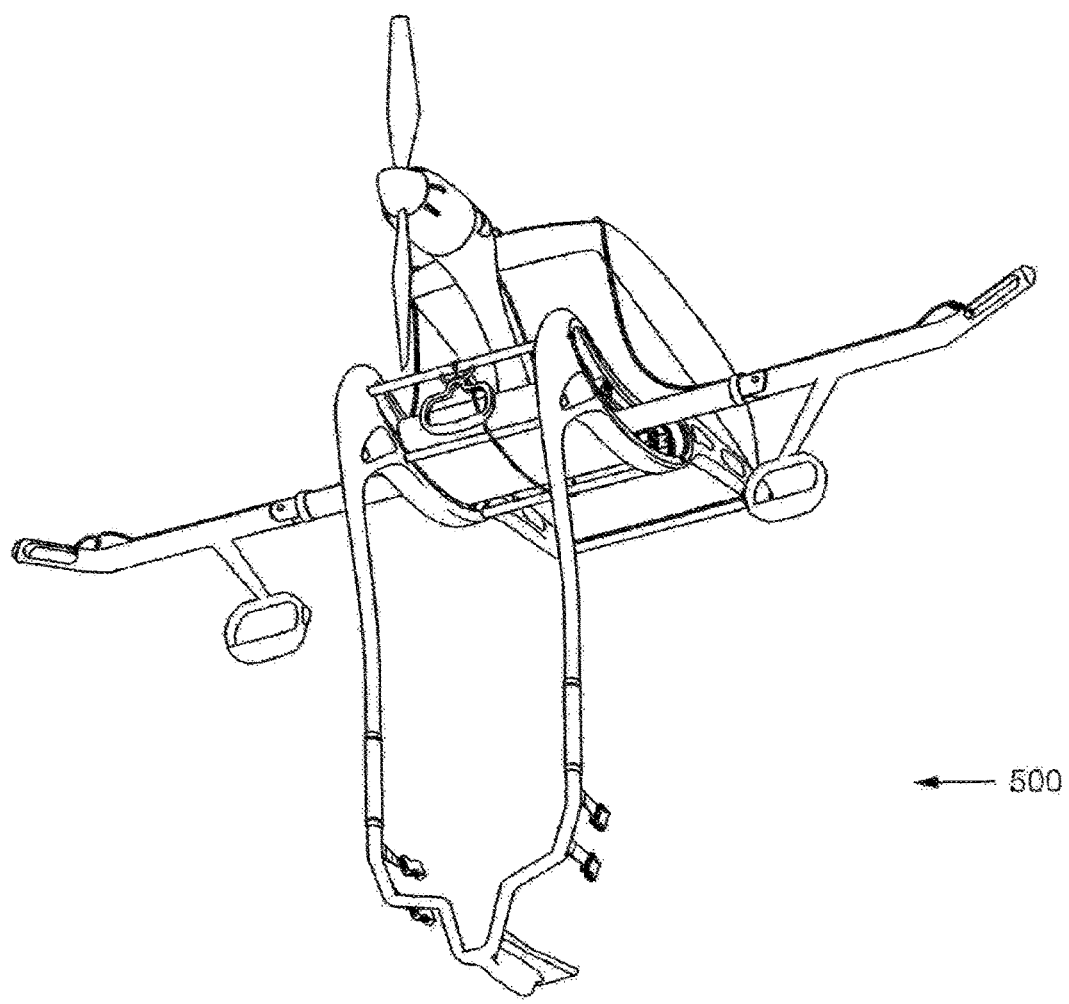
FIG. 2H is a forward perspective view from slightly below and from the right, of the frame and propulsion assembly of the air-vehicle without chute attached and with no operator/user.
Figure 4:
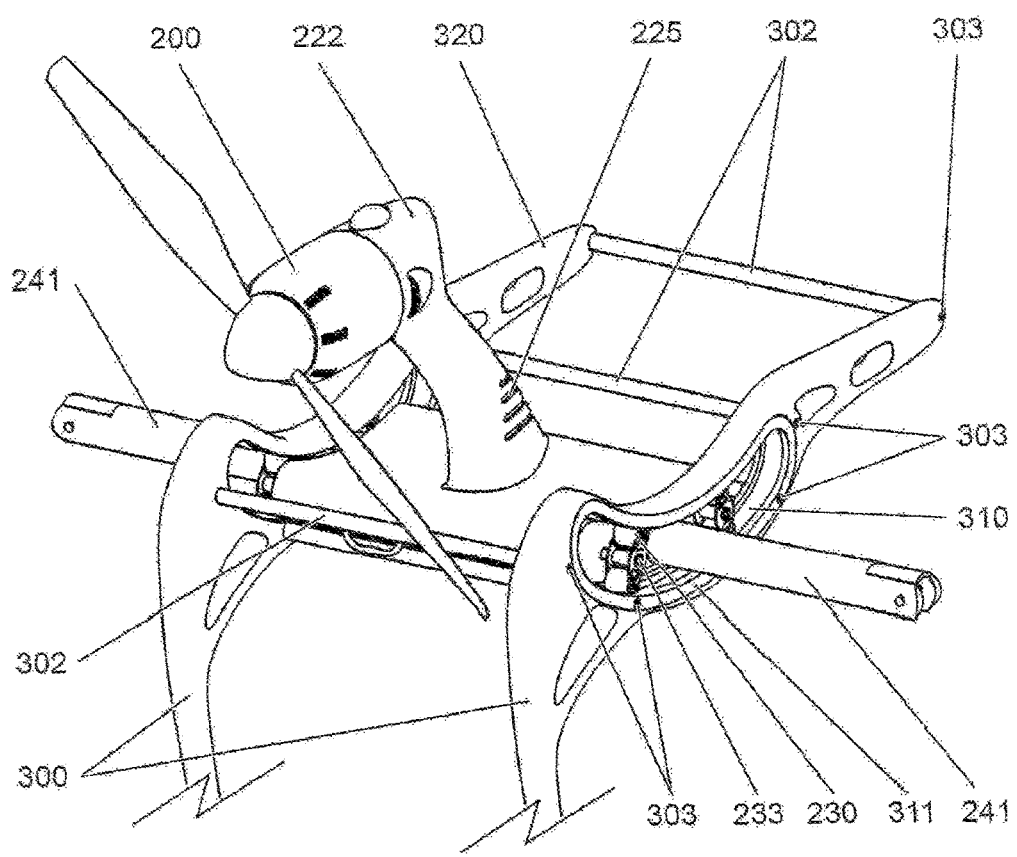
FIG. 4 is a front perspective view from slightly above and from the right, of the upper portion of the frame and propulsion assembly of the instant invention.
Figure 6:
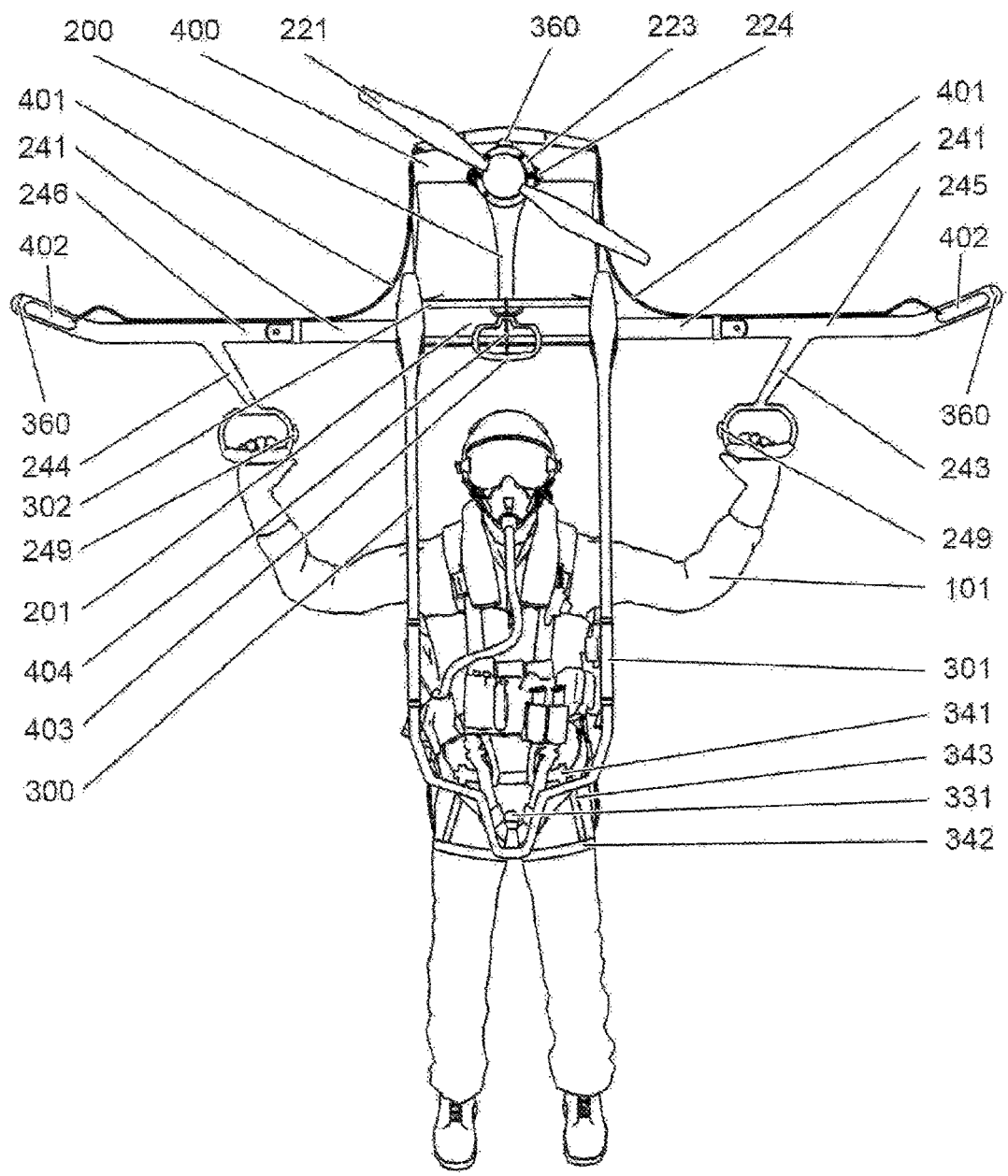
FIG. 6 is an illustration of the front view of the air vehicle with an operator/user in its flight positon without a parachute/parafoil attached of the instant invention.
Figure 7:
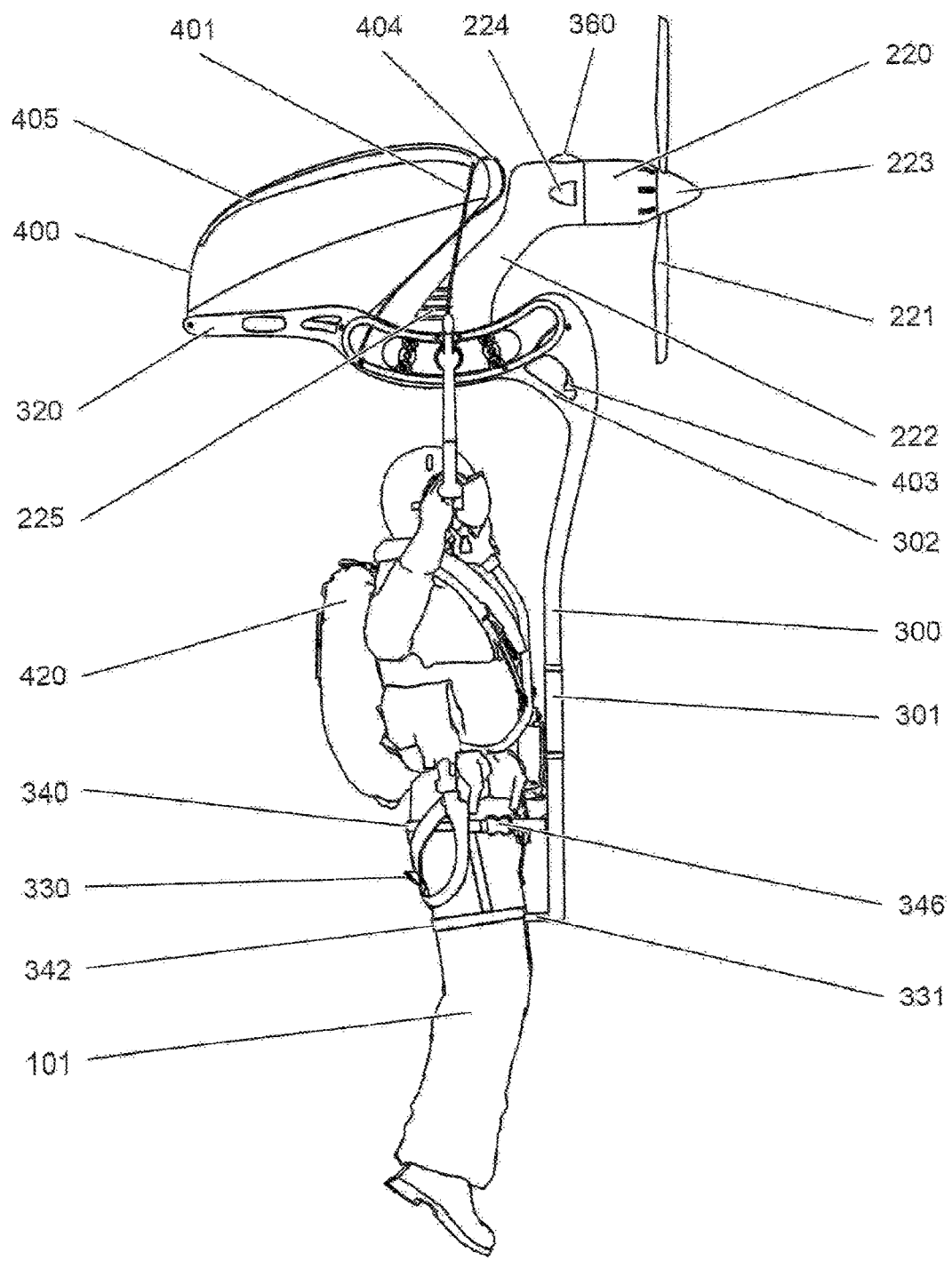
FIG. 7 is a right side view of the frame and propulsion assembly of the air-vehicle with an operator/user in its flight positon without a parachute/parafoil attached of the instant invention.

In some embodiments, frame assembly 300 can be adjusted by frame height adjusters 301 (FIGS. 2 and 7), which allow the height of the frame to be adjusted up and down, thus raising or lowering the seat assembly 330 to suit the needs of user 101 (FIGS. 1, 6, and 7). Such height adjustment may be made by using telescoping tubes, one of which having an opening and the other having a series of openings matching a selected height. A pin, bolt or the like would be passed through the single set of openings in one telescoping member and a selected set of openings of the plurality of sets of openings in the other member in order to select height of the frame. Frame assembly 300 may be made more rigid by adding frame support structures or gussets 302 (FIGS. 2, 4, and 7).

Main parachute container 400 contains a main parachute 450 (FIG. 1), and is mounted to a parachute mounting frame 320 (FIGS. 2, 4, and 7), which a sub-frame of the frame assembly 300. User 101 controls pitch, bank, and throttle of the air vehicle by operating left and right control arm hand controls 243, 244 respectively. For air vehicle bank or directional control, user 101 can pull down on the left or right control arm hand control (243 and 244) to either turn left or right. By pulling down on either of the control arm hand controls (243, 244), respective control lines or risers are pulled down in order to distort, open or close steering control surfaces of the parachute. This is accomplished by the control lines or risers being connected or coupled to openings 360 on the respective hinged left 245 or right 246 outer control arm to which hand controls 243, 244 are attached. In some embodiments, the main parachute risers 401 may be connected to openings 360 so that the parachute itself is distorted in order to control direction, while in other embodiments the main parachute risers may be connected to some part of the frame, such as a location behind propeller 221, or to rigid arms 241 inboard of the hinges and behind a propeller in order to avoid straining the hinges beyond their design limits. Such distortion beyond design limits might occur by flying in turbulent air, being dropped and deployed from an airplane or from a user pushing the aircraft beyond its flight envelope. Such embodiments may also be used where extra strength in supporting the frame is desired, or where extra weight is carried by the vehicle. In these latter embodiments, control lines that operate flaps or panels of the parachute to control direction would be connected at openings 360 of control arms 245, 246.

Figure 3:
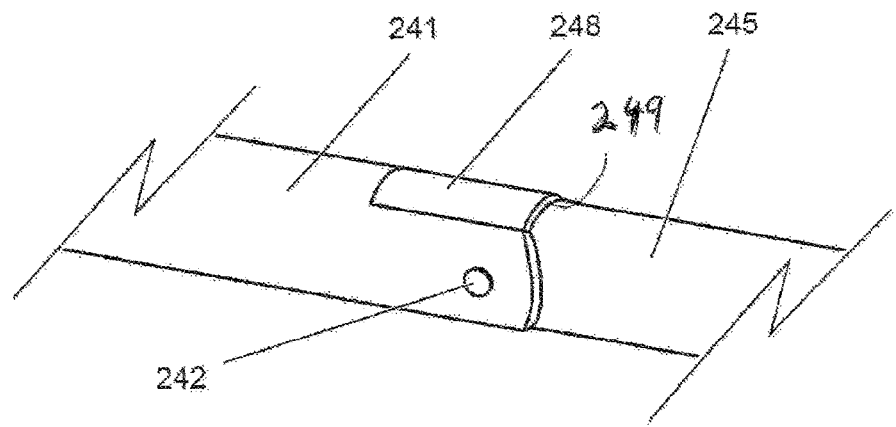
FIG. 3 is a front perspective view slightly from the right of the left hand side inner and outer control arm connection point of the instant invention.

In general, the left and right outer control arms (FIGS. 2, 245 and 246) may be prevented from extending upward past a predetermined point by a hinged region 3. In some embodiments, this position of the outer control arms 245, 246 would be generally coaxial with a respective inner arm 241. Here, and referring to FIG. 3, a portion 248 attached to outer arms 245, 246 may abut an upper surface of a respective rigid inner arm 241 to prevent further upward movement of arms 245, 246, or portions 248 may be constructed integrally with arms 241 so that upper ends of arms 245, 246 abut vertical surfaces 249 in the hinge to stop further upward movement of arms 245, 246. As should be apparent, arms 245, 246 pivot about pins 242 set in arms 241. In other embodiments, the outer control arms may extend higher before reaching a predetermined stopping point, as where certain parachutes, such as reflex wing parachutes, may require a continuous downward pull on control lines in order to control and maneuver the parachute. Using some such parachutes may not require a stop in the hinge as a user may want more range of motion in releasing the control lines upward. Of course, with these parachutes, the main risers would be attached to the frame behind the propeller or ducted fan, or to arms 241, with only the control lines attached to outer arms 245, 246. Additional control lines, such as brake lines, may be connected to be operated by feet of a user, as by stirrups that may be vertically slidably attached to the frame, and which may extend downward only partially a length of a user's fully extended legs so that the user may simply put their feet in the stirrups and be in a semi-crouched position when brakes are to be used. Where hand operated brakes are used, the brake lines may be slidably attached for vertical movement to arms 241. Here, provisions may be made to rapidly and temporarily lock the control lines to set the parachute in a predetermined trimmed position while brake lines are operated by hand, such as when landing.

Where main chute risers 401 (FIG. 2) are attached to the left and right outer control arms (245 and 246) at the riser mounting point 402; the risers 401 can be connected (tied) directly to the riser mounting point 402 or can be connected to another device, such as an opening ring (not shown). The operator/user can deploy the main chute 450 (FIG. 1) by pulling a ripcord handle 403 that is attached to the ripcord line 404 (FIGS. 2, 2A, 2B, 2D, 6, and 7), which opens the main chute container 400 main chute container flaps 405, allowing for the deployment of the main chute 450 (FIG. 1). A drogue parachute that may be spring loaded may be used to assist in deploying the main parachute. A throttle control toggle switch 249 (FIG. 6) may be attached to either of the left and right control arm hand controls 243, 244 for throttle control of the propulsion system (220), which drives a propeller 221 covered by a motor nose cone 223. Electrical wires (not shown) that run through the left or right outer control arm, through the inner control arm 241 and into a battery and electronics compartment 222 behind propulsion motor 200 (FIGS. 2, 4 and 6) would be used to connect toggle switch 249 to controls for regulating speed of the propulsion motor and thus thrust. As noted, the toggle switch could also be used to electrically control fuel supply to an internal combustion driven propulsion system, as by a control system operating a small stepper motor connected to a fuel throttle valve. Additional embodiments can incorporate other control functions operated by a second toggle switch on the other hand control, such as a locking mechanism (not shown) that could lock and release propulsion and control assembly guide wheels in any position along guide rails 310 (FIGS. 4 and 5).

Figure 4A:
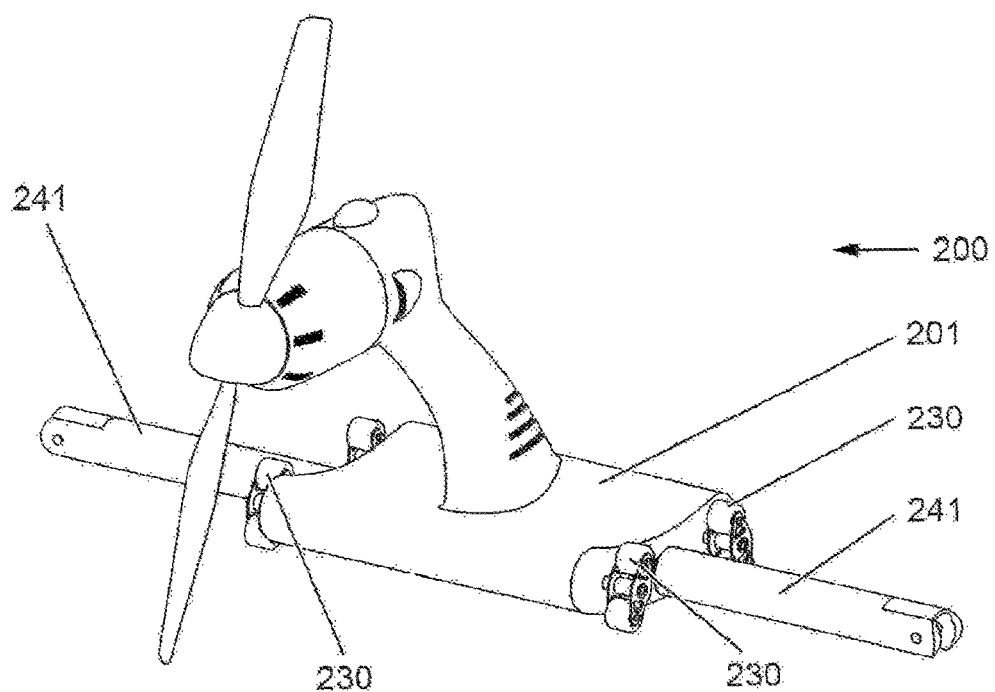
FIG. 4A is a front perspective view from slightly right and above of the propulsion and control assembly of the instant invention.

As noted, one embodiment for a propulsion system would be an electric motor driving a propeller or ducted fan; other embodiments could use other types of propulsion systems, such as chemical fuel internal combustion engines (not shown). In practice, any practical engine would work to drive a propeller or fan. The propulsion motor 200 in the present invention is cooled by airflow from forward flight over motor nose cone 223 (FIGS. 2, 6, and 7) and airflow created by propeller 221 that flows through air intakes 224 and exits out of air exhaust slits 225. In some embodiments where propulsion motor 200 is fixed, pitch control of the aircraft may be accomplished by adjusting thrust of the propulsion motor 200, as by increasing thrust to climb or decreasing thrust to lose altitude. Forward or backwards weight shifting by the user may also be used to gain or lose altitude. In other embodiments where propulsion motor 200 is movable, angle of the propulsion motor and propeller may be changed by the operator simultaneously pulling or pushing on the left and right control arm hand controls 243, 244 to gain or lose altitude, respectively. In these embodiments, the outer control arms 245, 246 are connected to inner control arms 241, which in turn are connected to a center mount assembly 201 that supports propulsion motor 200, are used to pivot motor 200 in order to direct thrust upward or downward, or adjusted to maintain level flight. Mount 201 is movably supported by guide wheels 230 (FIG. 4) and to which propulsion motor 200 is mounted, as shown in FIG. 4A. As noted, air-vehicle safety may be enhanced by installing airframe navigation lights 360, which may be LED lamps, on the tips of each outer control arm 245 and 245.

Figure 5:
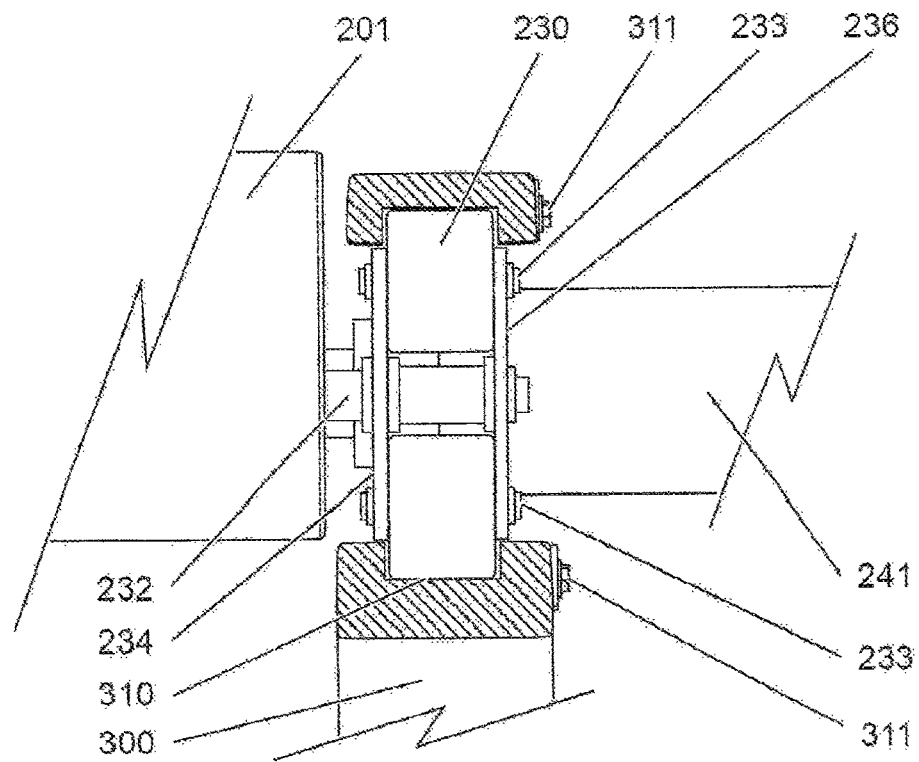
FIG. 5 is a cross section illustration of the guide wheels and wheel guide rails of the instant invention.

FIGS. 4, 4A and 5 depict one embodiment of an upper section of the frame assembly 300 that incorporates a movable center mount assembly 201 (FIG. 4A) in opposed rocker portions of frame assembly 300. As noted, a battery and electronics assembly (or fuel supply and small control system/lighting battery) may be housed in a motor mount 222 (FIG. 4) that supports the propulsion motor 200, the motor mount being fixed as shown to center mount assembly 201. Inner control arms 241 are also fixed to mount assembly 201 as shown in FIG. 4A. Propulsion system 200 and the battery and electronics assembly in mount 222 are cooled by free air flow through the air intake 224 (FIGS. 6 and 7) and exiting out of the air exhaust slits 225.

Center mount assembly 201 is provided with four sets of wheels 230 (FIG. 5), with two sets of wheels being mounted on opposed sides of assembly 201 as shown in FIG. 4A. Each set of wheels is mounted about a central axle 232 (FIG. 5) that is fixed in non-rotating relation to central mount assembly 201. Inner and outer plates 234, 236 are fixedly attached to axle 232, with wheels 230 mounted for rotation on axles that extend between plates 234, 236. Nuts or other fasteners 233 may be used to hold wheels 230 in place on their respective axles. With this construction, wheels 230 rotate at fixed locations as shown on opposed sides of central mount 201 and do not rotate about axle 232, but instead rotate on their own axles supported between fixed plates 234, 236.

As shown in FIGS. 4 and 5, wheels 230 ride in tracks or guide rails 310, allowing central mount assembly 201 to move fore and aft, which also tilts propulsion motor 200 upward when assembly 201 is moved forward, and tilts motor 200 downward when assembly 201 is moved aft. When tilted or pitched upward, the aircraft gains altitude, and when pitched downward altitude may be lost. Wheel guide rails 310 are incorporated into the frame assembly 300, and form flanged tracks in order to keep the wheels in the tracks. Other embodiments could incorporate a separate wheel guide section made of other materials, and attached to the frame by fasteners. One side of the flanges of the tracks comprises a removable outer wheel rail 311 that is held in place by frame support structure mounting hardware 303, which typically would be fasteners such as nuts, bolts, screws or the like.

FIG. 5 is a cut away view of the main frame's 300 wheel guide rails 310 showing relationship between propulsion and control assembly guide wheels 230 in a wheel guide rail 310, and held in place by the removable outer wheel rail 311 and frame support structure mounting hardware 302. As shown, wheels 230 are mounted to the center mount assembly 201 by fixed wheel axle 232. For securing axle 232 in fixed relation in assembly 201, axle 232 may have a non-circular cross section, such as a generally square or oblong cross section, and be bolted into a mating non-circular opening in central member 201. Plates 234, 236 may also have mating non-circular openings that fit on axle 232. As noted, the guide wheels 230 are held into the guide rails 310 by the removable outer wheel rail 311 and secured into place by the frame support structure mounting hardware 303. Inner control arms 241 are mounted to the center and sides of the center mount assembly 201 and can be either mounted to the exterior of the center mount assembly 201 or other embodiments may contain a one-piece center control arm 241 that extends through assembly 201 and is mounted inside the center mount assembly 201. In some embodiments, one or more dampers may be attached between assembly 201 and frame 300 in order to dampen undesirable oscillations between assembly 201 and frame 300 when a user moves assembly 201 either fore or aft.

Figure 8:
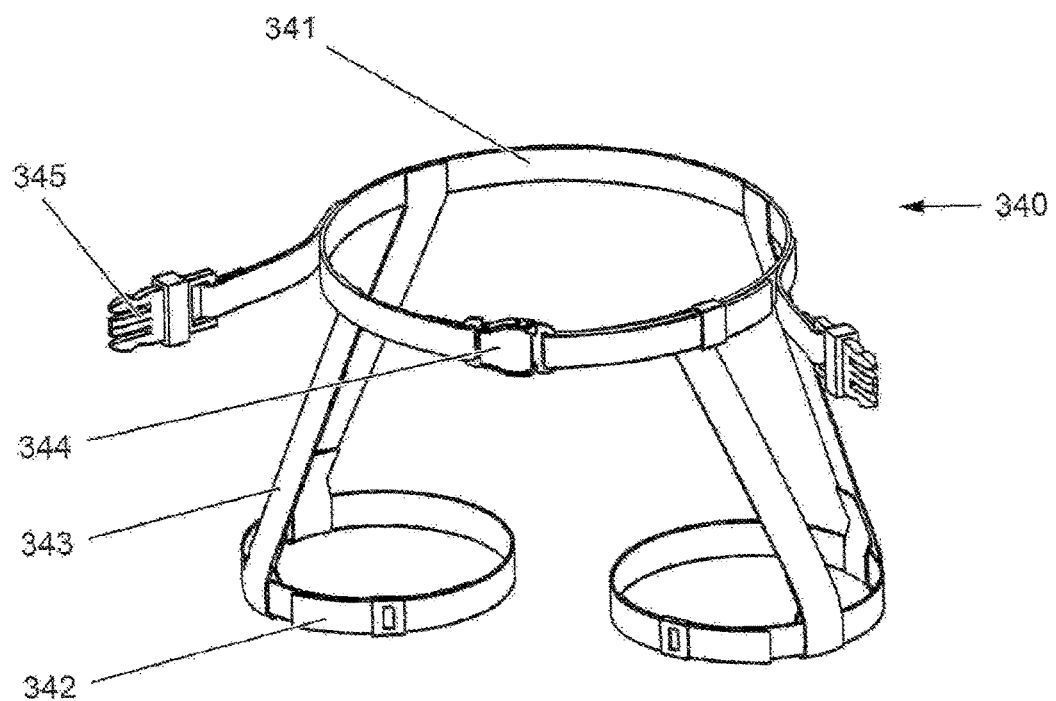
FIG. 8 is a front perspective view slightly from above of the preferred embodiment of a harness assembly used to secure an operator/user to the air vehicle of the instant invention.

FIG. 6 is a frontal view and FIG. 7 is a side view of the air vehicle with the operator/user 101 attached via the harness assembly 340 (FIG. 8). The main harness belt 341 fits around the operator/user's 101 waist, and is the primary means for securing the operator/user 101 to the frame assembly 300 via the harness quick release male fitting 345 (FIG. 8) and locking into the frame assembly 300 harness assembly quick release female fittings 346 (not shown). The main harness belt 341 is assisted in securing the operator/user 101 by leg harness 342 straps and being connected to the main harness belt 341 via leg harness connection straps 343. The operator/user 101 is depicted with an emergency parachute 420 for safety purposes. In an emergency, the operator/user 101 can release the harness assembly quick release male fitting (FIG. 8), push away from the craft and freefall away from the air-vehicle assembly 100 and safely fly to the ground by deploying the emergency parachute 420.

FIG. 8 is a front perspective view of one embodiment for the harness assembly 340, showing the main harness quick release buckle that is attached to the front of the main harness belt 341. The main harness belt 341 is assisted in maintaining its position by the leg harness connection straps 343 (FIGS. 6 and 8) that are attached to the leg harnesses 342 which wrap around the operator/user's legs.

Figure 9:
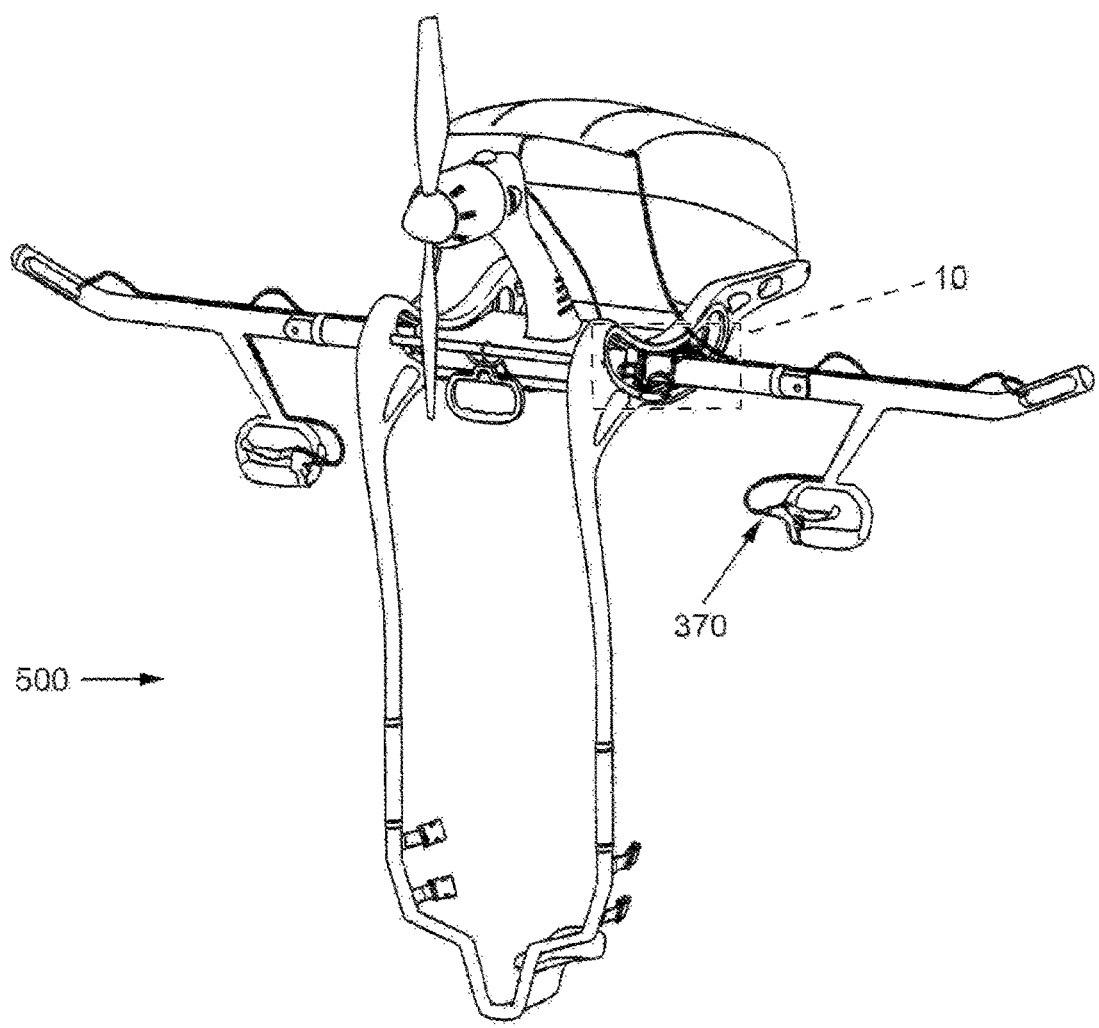
FIG. 9 is a front perspective view of the frame and propulsion system of the preferred embodiment.
Figure 10:
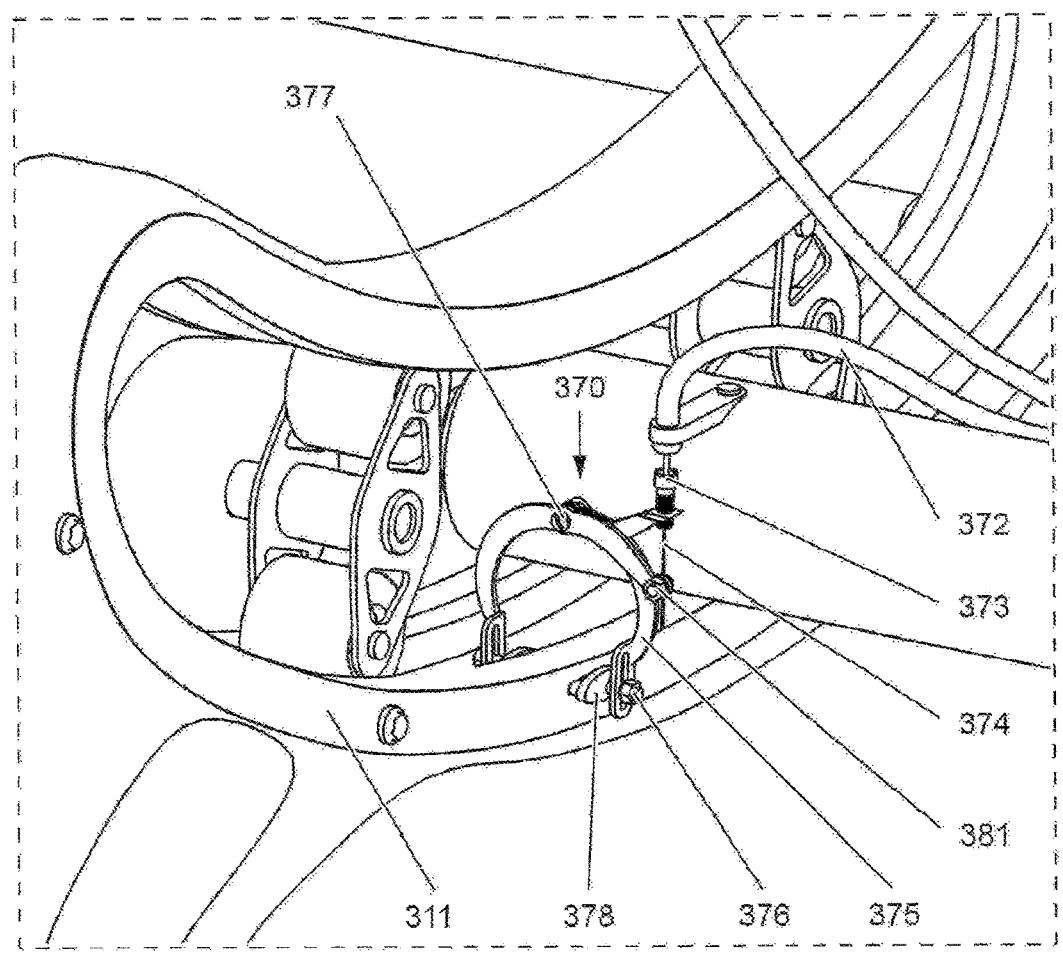
FIG. 10 is an expanded perspective view of the brake assembly of the present invention.
Figure 11:
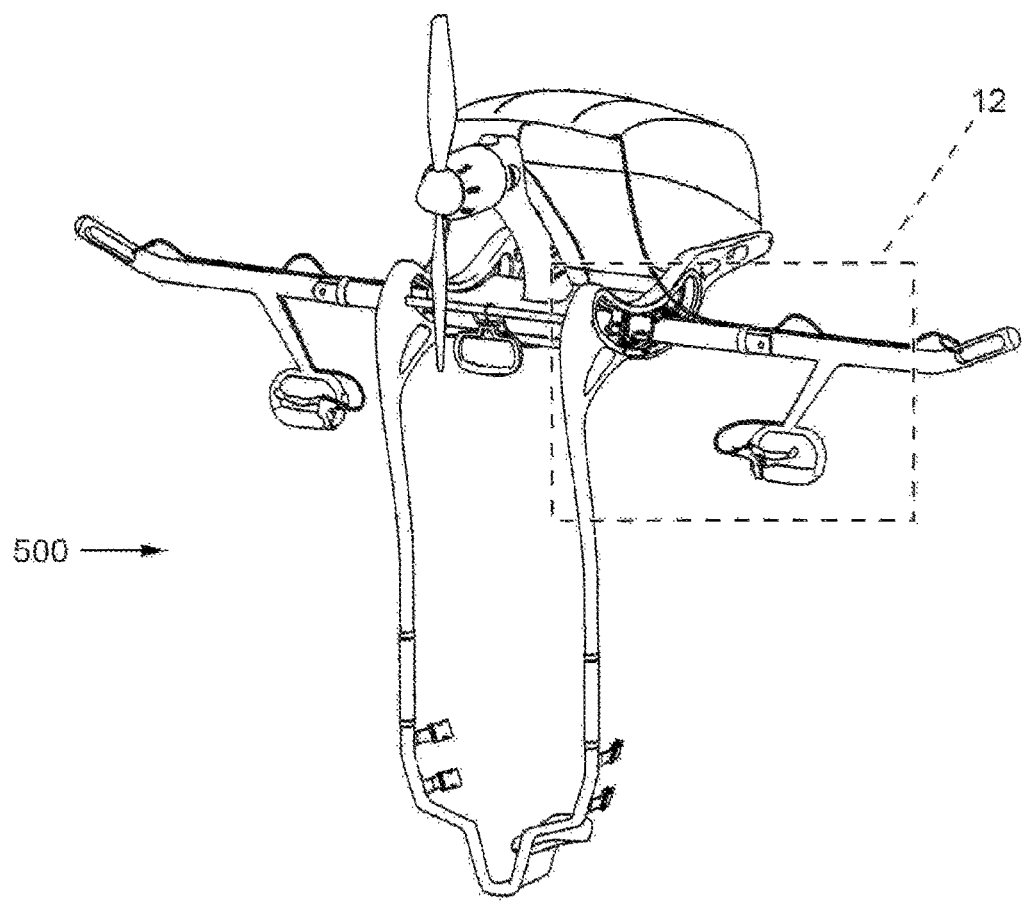
FIG. 11 is a front perspective view of the frame and propulsion system of the preferred embodiment.
Figure 12:
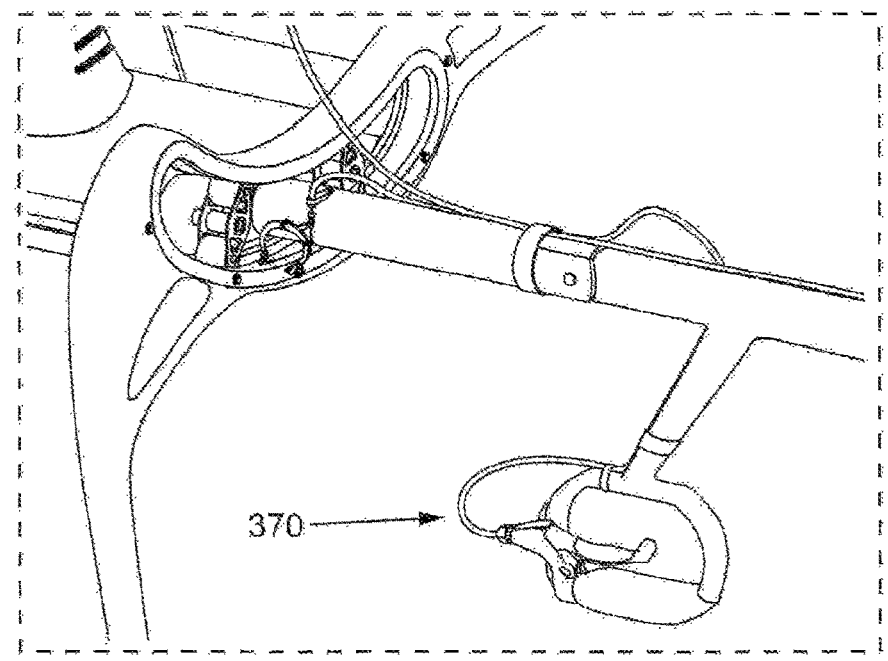
FIG. 12 is an expanded view of the entire brake assembly of the present invention.
Figure 13:
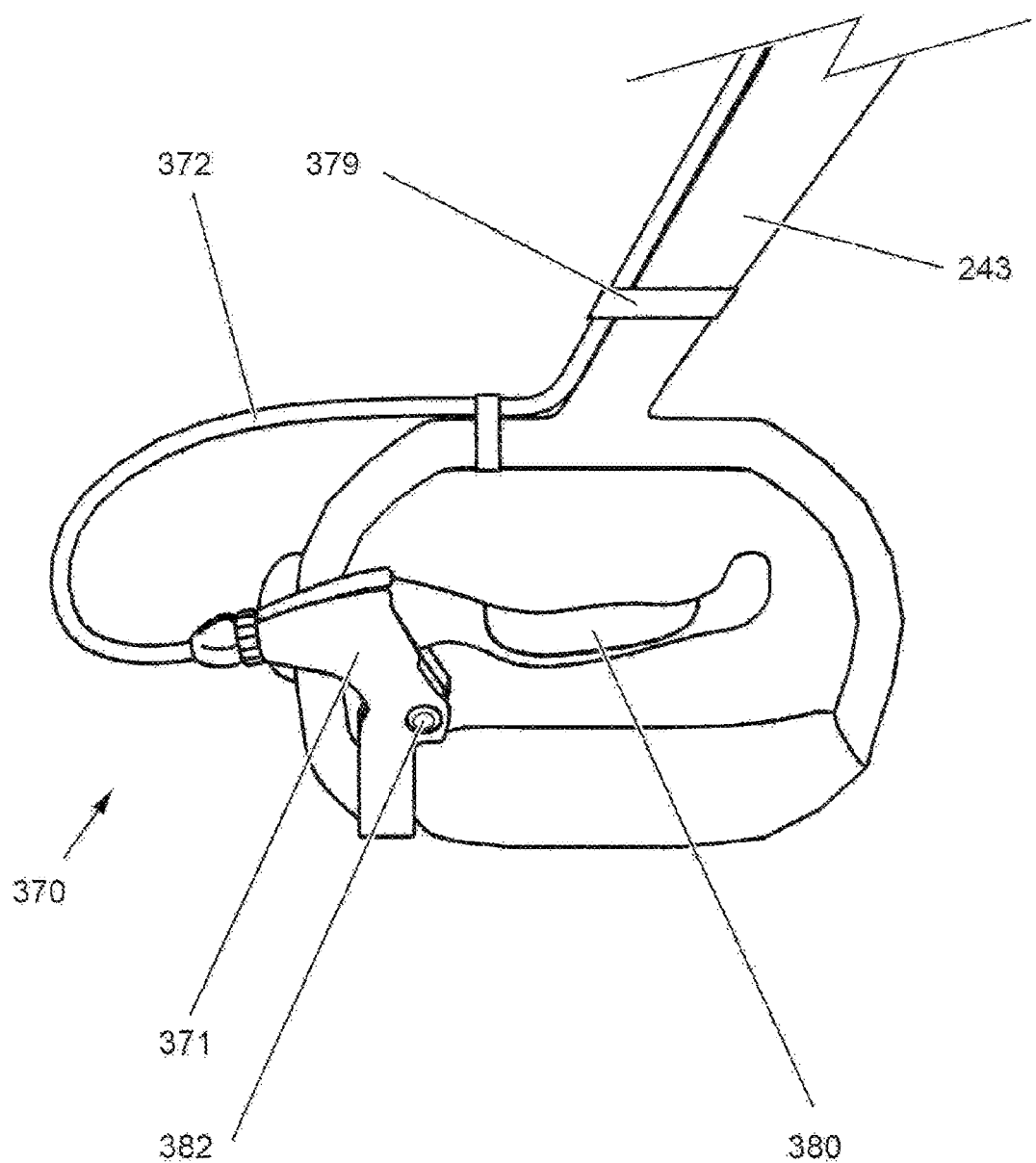
FIG. 13 is a front view of the hand controls of the brake system of the present invention.

FIG. 9 is a front perspective view of the frame and propulsion assembly 500 of the present invention with a brake assembly 370 installed. These embodiments would incorporate a brake assembly 370 on the control handgrips that would allow the operator/user to have the ability to hold the propulsion and control assembly 200 (FIG. 4A) in a particular position, thus holding propulsion motor 200 at a particular pitch along the wheel guide rails 310 (FIG. 4). One embodiment may use electrical or hydraulic brakes, or a combination thereof to apply pressure to a set of disc pads. FIGS. 9 and 10 show a simpler brake assembly 370 using a brake system that is similar to what is used on a typical bicycle wheel. For this particular embodiment, FIG. 10 shows a brake cable assembly 372, which houses the brake cable 374 and has the ability to be adjusted by the brake cable barrel adjuster 373 and the cable locking hardware 381. When cable 374 is pulled by pulling on the brake lever 380 (FIG. 13), the cable pulls the brake arches 375 together, which cause the brake pads 378 to press up against the removable outer wheel rail 311. The brake arches are held in place by mounting hardware 377. The brake pads 378 can be adjusted up and down by adjusting the brake pad mounting/adjustment hardware 376. FIG. 11 is a front perspective view of the frame and propulsion system 500, with an enlarged view of the brake assembly 370 shown in FIG. 12. FIG. 13 is a view of the left control arm hand control 243 with a brake assembly 370 mounted. Brake handle 371 is mounted directly to the left (or right) control arm handle control 243 by means of a clamp and hardware (not shown). Brake lever 380 is attached to brake handle 371 by mounting hardware 382. As noted, when lever 380 is pulled, brake cable 374 (FIG. 10) is pulled inside of brake cable assembly 372, which in turn activates brake arches 375, which press brake pads 378 against the removable outer wheel rail 311. This holds central assembly 201 in place within wheel track or guide rails 310. In other embodiments a user may maintain positive control over pitch of central assembly 201 using left and right control arm hand controls 243, 244. The brake cable assembly 372 is held in place by brake cable retention straps 379 which can be made of various malleable materials, such as Velcro cloth, tape, or plastic ties.

It is anticipated that the aircraft would be constructed of materials that are sufficiently light that so that a user could land the craft in the manner of a paraglider and hold the apparatus upright. Here, when the craft is approximately 2 feet above the ground, the user would turn off the motor and stall the parachute to reduce forward speed. In such a stall, some parachutes would controllably move forward over or slightly ahead of the aircraft, reducing or eliminating any forward speed. Depending on the parachute used, the user may need to run a short distance to accommodate any remaining forward speed, or simply land while standing upright. In military applications, the user may operate quick releases that immediately separate the user from the craft, and simply let the craft fall to the ground after landing. Bumpers or shock absorbers may be used to prevent breakage of the apparatus. Landing struts may also be provided that may deploy backwards from the frame and maintain a backward tilt orientation after landing. Likewise, straight struts may be used that extend downward from the frame and used in conjunction with at least one backwards strut in a tripod configuration. In other embodiments, the craft may have straps, and possibly a seat, that allows the user and equipment to fall free a short distance to the ground while the aircraft returns to a base, as under remote control or under a GPS directed control system. Under such control systems, the user may fly to an intended target, release from the aircraft while simultaneously engaging a "return home" control function. Such control systems are well known with drone helicopters, as are GPS control systems that will fly a craft to a designated location. In these embodiments, extended range provisions may be made, such as fuel engines and fuel reservoirs.

Taking off from the ground would be very similar to a user taking off using a paraglider. Here, the user would strap himself/herself to the aircraft with the parachute deployed on the ground to the rear. With the aircraft held upright, the user would then begin to walk forward and engage the propulsion motor. The motor could be tilted upward so as to direct air into the parachute. As the parachute begins to fill with air and rise upward, the user would begin to run if necessary until sufficient forward speed is attained to lift the user and aircraft from the ground. The user could then operate the parachute controls to control direction, and control motor thrust and pitch of the motor to control altitude. The seat may be made foldable upward into the frame to facilitate takeoff, and then moved from a folded position to a position that the user could sit on after leaving the ground.

While many embodiments are disclosed, it should be apparent that any disclosed feature or mode may be used with any other disclosed feature or mode in any combination. Any steerable parachute may be used, such as a standard parachute having steering cutouts and controllable flaps, foils, ram parachutes, wings, reflex wings and so forth.

Having thus described my invention and the manner of its use, it should be apparent to those skilled in the relevant arts that incidental changes may be made thereto that fairly fall within the scope of the following appended claims, wherein I claim:

1. A powered parachute aircraft comprising:
    a frame for holding a user in a vertical orientation,
    a propulsion motor mounted above a user to an upper part of said frame, said propulsion motor mounted for tilting fore and aft movement so that pitch of said propulsion motor can be changed,
    a left movable control arm coupled to said propulsion motor and a right movable control arm coupled to said propulsion motor,
    a parachute supporting said frame and said propulsion motor, said parachute having at least one left control line connected to said left movable control arm and at least one right control line connected to said right movable control arm,
    whereby simultaneous fore and aft movement of said left movable control arm and said right movable control arm changes pitch of said propulsion motor to control altitude of said powered parachute aircraft, and vertical movement of said left movable control arm and said right movable control arm changes direction of said powered parachute aircraft.

2. The powered parachute aircraft as set forth in claim 1 wherein said propulsion motor and said left movable control arm and said right movable control arm are mounted to a center mount assembly mounted for said fore and aft movement in said upper part of said frame.

3. The powered parachute aircraft as set forth in claim 2 wherein said left movable control arm further comprises a left inner control arm rigidly extending from said center mount assembly and a vertically movable left outer control arm pivotally attached at an inner end to an outer end of said left inner control arm, with said at least one left control line of said parachute connected to an outer end of said vertically movable left outer control arm, and said right movable control arm further comprises a right inner control arm rigidly extending from said center mount assembly and a vertically movable right outer control arm pivotally attached at an inner end to an outer end of said right inner control arm, with said at least one right control line of said parachute connected to an outer end of said vertically movable right outer control arm.

4. The powered parachute aircraft as set forth in claim 3 further comprising a left flanged track in an upper part of said frame and a right flanged track in said upper part of said frame, said left flanged track and said right flanged track in coaligned relation and extending generally parallel to a direction of flight of said powered parachute aircraft, said center mount assembly having a left set of wheels and a right set of wheels, said left set of wheels fitted for movement in said left flanged track and said right set of wheels fitted for movement in said right flanged track, said left flanged track and said right flanged track curved so that said center mount assembly tilts said propulsion motor upward when said center mount assembly is moved forward by a user.

5. The powered parachute aircraft as set forth in claim 4 further comprising a left handle attached to said vertically movable left outer control arm and a right handle attached to said vertically movable right outer control arm, so that a user may move said vertically movable left outer control arm or said vertically movable right outer control arm using said left handle or said right handle, respectively, to control direction of said powered parachute aircraft, and move said center mount assembly fore and aft using said left handle and said right handle, thereby tilting said propulsion motor to control altitude of said powered parachute aircraft.

6. The powered parachute aircraft of claim 5 further comprising a throttle for said propulsion motor, said throttle mounted to one of said left handle and said right handle.

7. The powered parachute aircraft of claim 5 further comprising a releasable lock for releasably locking said center mount assembly and thus said propulsion motor at a selected pitch, with a control for said lock mounted to one of said left handle and said right handle.

8. A powered parachute aircraft comprising:
    a vertically disposed frame configured for supporting a user in a vertical orientation,
    a center mount assembly mounted for fore and aft movement along a curved plane to an upper part of said frame and above a user,
    a propulsion motor mounted to said center mount assembly,
    a left vertically movable control arm and a right vertically movable control arm, said left vertically movable control arm attached to a left side of said center mount assembly and said right vertically movable control arm attached to a right side of said center mount assembly,
    a parachute having a plurality of lines for suspending said center mount assembly and said frame below said parachute, with at least one of said lines being a left control line for controlling a leftward direction of said parachute, and at least one of said lines being a right control line for controlling a rightward direction of said parachute,
    said at least one left control line attached for vertical movement to said left vertically movable control arm and said at least one right control line attached for vertical movement to said right vertically movable control arm,
    whereby direction of flight of said powered parachute aircraft is controlled by a user moving said left vertically movable control arm and said right vertically movable control arm in vertical directions, and altitude can be gained by moving said center mount assembly along said curved plane to change a pitch angle of said propulsion motor to an upward pitch.

9. The powered parachute aircraft of claim 8 wherein said center mount assembly and said upper part of said frame further comprises:
    a left flanged track in a left side of said frame above a user, a right flanged track in a right side of said frame above a user, said left flanged track and said right flanged track being opposed from one another in said frame and oriented generally horizontally in said frame from front to back of said frame, said left flanged track and said right flanged track being in said curved plane so that opposite ends of said left flanged track are higher than a middle of said left flanged track and opposite ends of said right flanged track are higher than a middle of said right flanged track, a left set of wheels on said left side of said center mount assembly and a right set of wheels on a right side of said center mount assembly, said left set of wheels and said right set of wheels being opposed from each other across said center mount assembly, said left set of wheels riding in said left flanged track and said right set of wheels riding in said right flanged track, so that said center mount assembly is supported for said fore to aft movement between said left flanged track and said right flanged track, whereby when said center mount assembly is pushed forward by a user, said center mount assembly tilts said propulsion motor upward, for gaining altitude, and when said center mount assembly is pulled backward, said center mount assembly levels said propulsion motor or tilts said propulsion motor downward, for maintaining or losing altitude, respectively.

10. The powered parachute aircraft as set forth in claim 9 wherein said left flanged track further comprises an upper left flanged track and a lower left flanged track, and said right flanged track further comprises an upper right flanged track and a lower right flanged track, with said left set of wheels riding in said upper left flanged track and said lower left flanged track, and said right set of wheels riding in said upper right flanged track and said lower right flanged track.

11. The powered parachute aircraft as set forth in claim 9 wherein said propulsion motor is mounted to a forward portion of said center mount assembly, with said parachute mounted behind said propulsion motor.

12. The powered parachute aircraft as set forth in claim 9 wherein said left vertically movable control arm and said right vertically movable control arm each further comprises:
   a left inner control arm fixedly extending from a left side of said center mount assembly and a right inner control arm fixedly extending from a right side of said center mount assembly,
   a left hinge and a right hinge attached to respective ends of said left inner control arm and said right inner control arm, respectively,
   said left vertically movable control arm and said right vertically movable control arm each attached at one end to said left hinge and said right hinge, respectively, with said left control line attached to an outer end of said left vertically movable control arm and said right control line attached to an outer end of said right vertically movable control arm,
   whereby said left vertically movable control arm and said right vertically movable control arm each pivot vertically about said left hinge and said right hinge, respectively.

13. The powered parachute aircraft as set forth in claim 12 wherein said left hinge and said right hinge each further comprises a stop, for limiting vertical movement of said left vertically movable control arm and said right vertically movable control arm.

14. The powered parachute aircraft as set forth in claim 12 wherein at least some of said plurality of lines for suspending said center mount assembly and said frame below said parachute in said vertical orientation are attached to said frame.

15. The powered parachute as set forth in claim 12 wherein at least some of said plurality of lines for suspending said center mount assembly and said frame below said parachute in said vertical orientation are attached to said left inner control arm and said right inner control arm.

16. The powered parachute aircraft as set forth in claim 9 wherein said left set of wheels and said right set of wheels each further comprises a front set of wheels and a rear set of wheels.

17. The powered parachute aircraft as set forth in claim 16 wherein said left inner control arm extends from said center mount assembly between said front set of wheels and said rear set of wheels of said left set of wheels, and said right inner control arm extends from said center mount assembly between said front set of wheels and said rear set of wheels of said right set of wheels, said left inner control arm also extending through said left flanged track and said right inner control arm extending through said right flanged track.

18. The powered parachute aircraft as set forth in claim 8 further comprising a left handle attached to said left vertically movable control arm and a right handle attached to said right vertically movable control arm, said left handle and said right handle allowing said center mount assembly to be moved forward and backward for controlling altitude of said powered parachute aircraft, and said left vertically movable control arm and said right vertically movable control arm to be moved vertically for controlling direction of said powered parachute aircraft.

19. The powered parachute aircraft as set forth in claim 18 further comprising a throttle for said propulsion motor, said throttle mounted to one of said left handle and said right handle.

20. The powered parachute aircraft as set forth in claim 19 further comprising a releasable lock for said center mount assembly, for releasably locking said center mount assembly at a selected position in said left flanged track and said right flanged track, said releasable lock having a control mounted to one of said left handle and said right handle.

* * * * *